United States Patent
Hoffman et al.

(10) Patent No.: US 8,739,037 B1
(45) Date of Patent: May 27, 2014

(54) METHOD AND APPARATUS FOR PROMOTING ON-LINE ACTIVITIES USING RULES-BASED VIRTUAL WORLDS

(75) Inventors: Steven Samuel Hoffman, San Francisco, CA (US); Naomi Kokubo, San Francisco, CA (US)

(73) Assignee: Hyperlayers, Inc., San Francisco, CA (US)

( * ) Notice: Subject to any disclaimer, the term of this patent is extended or adjusted under 35 U.S.C. 154(b) by 1343 days.

(21) Appl. No.: 12/126,255

(22) Filed: May 23, 2008

Related U.S. Application Data

(60) Provisional application No. 60/940,955, filed on May 30, 2007, provisional application No. 60/941,250, filed on May 31, 2007, provisional application No. 60/941,258, filed on May 31, 2007, provisional application No. 60/941,261, filed on May 31, 2007, provisional application No. 60/955,137, filed on Aug. 10, 2007, provisional application No. 60/955,144, filed on Aug. 10, 2007, provisional application No. 60/974,438, filed on Sep. 21, 2007, provisional application No. 61/034,451, filed on Mar. 6, 2008.

(51) Int. Cl.
*G06N 3/06* (2006.01)
*G06N 3/00* (2006.01)

(52) U.S. Cl.
CPC ...................................... *G06N 3/006* (2013.01)
USPC ........................................... 715/706; 715/753

(58) Field of Classification Search
CPC ......................... G06N 3/006; G06F 17/30873
USPC ......... 715/748, 749, 762–763, 800–805, 753, 715/756–757, 968
See application file for complete search history.

(56) References Cited

U.S. PATENT DOCUMENTS

| | | | |
|---|---|---|---|
| 2003/0154126 A1* | 8/2003 | Gehlot et al. | 705/14 |
| 2004/0267943 A1* | 12/2004 | Ryu | 709/228 |
| 2006/0195379 A1* | 8/2006 | Abecassis et al. | 705/35 |
| 2007/0099701 A1* | 5/2007 | Simon et al. | 463/40 |
| 2007/0197274 A1* | 8/2007 | Dugan | 463/7 |
| 2007/0239676 A1* | 10/2007 | Stonehocker et al. | 707/3 |
| 2007/0243926 A1* | 10/2007 | Cheng | 463/23 |
| 2007/0293212 A1* | 12/2007 | Quon et al. | 455/420 |
| 2008/0046919 A1* | 2/2008 | Carmi et al. | 725/32 |
| 2008/0154951 A1* | 6/2008 | Martinez et al. | 707/103 Y |
| 2008/0189169 A1* | 8/2008 | Turpin et al. | 705/10 |

(Continued)

*Primary Examiner* — Steven Sax
(74) *Attorney, Agent, or Firm* — Pillsbury Winthrop Shaw Pittman LLP

(57) ABSTRACT

The present invention relates generally to the field of computer and network software, and more particularly it relates to a computer system and method for promoting virtual world and specific on-line activities through rules, awards and other incentives. According to some aspects, the present invention maintains rules-based virtual world(s) and activities, wherein the rules are designed to allow users to achieve a certain status, skill and/or reputation level, and to reward them accordingly. Rewards can include access to certain virtual activities (e.g. interactive objects, games, etc.) and/or virtual spaces, possession of certain Virtual Collectibles, and other enhancements to their on-line experience. Rules and criteria can specify that such rewards are provided to users based on their skill level in virtual games hosted by system, the number and type of Virtual Collectibles they have already acquired, the reputation they have gained as traders or chatters within the virtual world(s), etc. According to certain other aspects of the invention, the rules and criteria for providing rewards are designed to promote further activity with the system and to directly and indirectly drive traffic to sites of partners.

16 Claims, 10 Drawing Sheets

(56) References Cited

U.S. PATENT DOCUMENTS

| | | | |
|---|---|---|---|
| 2008/0244038 A1* | 10/2008 | Martinez | 709/218 |
| 2009/0112701 A1* | 4/2009 | Turpin et al. | 705/10 |
| 2010/0229082 A1* | 9/2010 | Karmarkar et al. | 715/205 |
| 2011/0059729 A1* | 3/2011 | Simon et al. | 455/414.1 |

* cited by examiner

METHOD AND APPARATUS FOR PROMOTING ON-LINE ACTIVITIES USING RULES-BASED VIRTUAL WORLDS

CROSS-REFERENCE TO RELATED APPLICATIONS

The present application claims priority to U.S. Provisional Appln. No. 60/940,955 filed May 30, 2007, U.S. Provisional Appln. Nos. 60/941,250, 60/941,258 and 60/941,261, all filed May 31, 2007, U.S. Provisional Appln. Nos. 60/955,137 and 60/955,144 filed Aug. 10, 2007, U.S. Provisional Appln. No. 60/974,438, filed Sep. 21, 2007, and U.S. Provisional Appln. No. 61/034,451, filed Mar. 6, 2008, the contents of which are incorporated by reference herein in their entirety.

FIELD OF THE INVENTION

The present invention relates to computer and network software, and more particularly it relates to methods and apparatuses for maintaining rule-based virtual worlds and providing techniques for promoting activities within virtual worlds and directly or indirectly driving on-line traffic to partner sites.

BACKGROUND OF THE RELATED ART

There has been a recent surge in "virtual world" technologies that allow users to assume virtual identities (e.g. avatars) and possibly also to interact with other users online, such as Second Life, Habbo, Zwinky, Gaia, Club Penguin, Webkinz. These are typically accessed via dedicated websites and subscriptions, and are typically closed systems (i.e. a user in one virtual community cannot directly interact with users in other virtual communities). These online communities sometimes further offer virtual items that can be bought and sold within their virtual worlds, such as virtual furniture, virtual clothing, virtual real estate, etc.

One problem with existing "virtual world" products is that they typically require users to go to specific online destinations to assume virtual identities and acquire and use virtual items rather than allowing users to meet other users as well as pick up and use virtual items while browsing any website on the Internet. Accordingly, it would be desirable if a system was provided in which users could meet other users anywhere on worldwide web, as well as obtain and use virtual objects and virtual goods while they surf anywhere on the worldwide web.

Co-pending U.S. application Ser. No. 12/037,019, commonly owned by the present assignee, the contents of which being incorporated herein by reference in their entirety, dramatically advanced the state of the art by providing a method and apparatus for distributing virtual objects such as Virtual Collectibles. According to an aspect of the co-pending application, users can accumulate Virtual Collectibles in the process of casually surfing the web. The system detects what site(s) the user is visiting and determines whether to reward the user with a Virtual Collectible when the user enters or links to a predetermined URL, such as the URL of a partner website. By entertaining the user in the process of visiting a partner website, the user is more likely to remember and favorably view the partner and its products and services.

Although this functionality by itself vastly improves upon conventional means of promoting on-line activities, additional improvements are possible by further leveraging the discoveries and functionalities of the co-pending application, including improvements that even further overcome the above-described and other disadvantages. For example, the system of the co-pending application includes virtual world(s) where Virtual Collectibles can be displayed, used, and traded. Moreover, the system allows users to interact with other users in the virtual world(s). It would be desirable if the principles of the invention of the co-pending application could be extended to further reward users for becoming skilled and experienced in such virtual worlds, which can further cause them to continue using the system, and to attract others to the system, thereby directly or indirectly promoting on-line activities on partner sites.

SUMMARY OF THE INVENTION

The present invention relates generally to the field of computer and network software, and more particularly it relates to a computer system and method for promoting virtual world and specific on-line activities through rules, awards and other incentives. According to some aspects, the present invention maintains rules-based virtual world(s) and activities, wherein the rules are designed to allow users to achieve a certain status, skill and/or reputation level, and to reward them accordingly. Rewards can include access to certain virtual activities (e.g. interactive objects, games, etc.) and/or virtual spaces, possession of certain Virtual Collectibles, and other enhancements to their on-line experience. Rules and criteria can specify that such rewards are provided to users based on their skill level in virtual games hosted by system, the number and type of Virtual Collectibles they have already acquired, the reputation they have gained as traders or chatters within the virtual world(s), etc. According to certain other aspects of the invention, the rules and criteria for providing rewards are designed to promote further activity with the system and to directly and indirectly drive traffic to sites of partners.

In furtherance of these and other aspects, a method according to embodiments of the invention includes maintaining information about a user's level within a rules-based system, allowing a user to surf the web and receive normal web content using a web browser, and automatically supplementing the normal web content that the user receives via the web browser with additional content based on the maintained information. In additional furtherance of the above and other aspects, a system according to embodiments of the invention includes a virtual world manager that maintains information about a user's level within the system, a port that receives information regarding normal web content the user receives using a web browser, and a distribution manager that determines whether to automatically supplement the normal web content that the user receives via the web browser with additional content based on the maintained information.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

Figure 1:
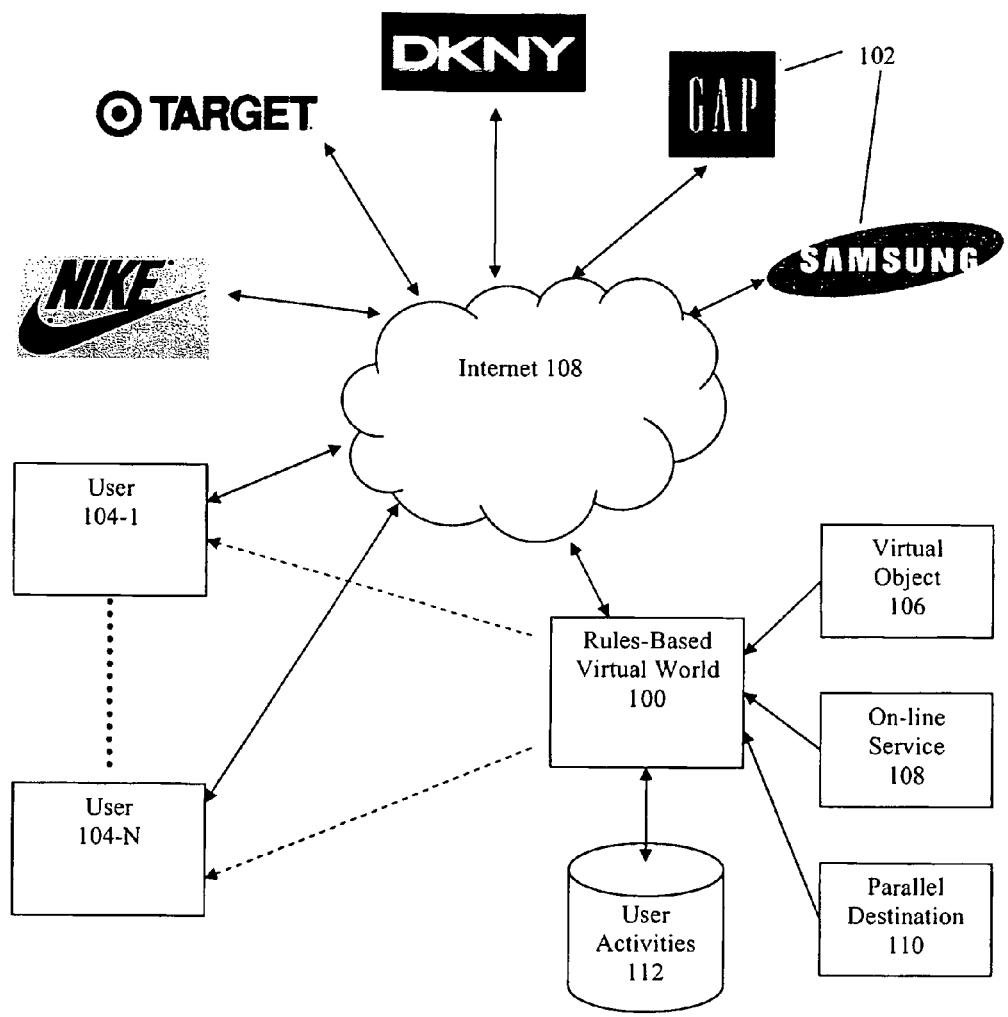
FIG. 1 is a block diagram illustrating the basic concepts of promoting virtual world activities through rules and awards such as Virtual Collectibles according to the invention.

As generally shown in FIG. 1, the present invention can be embodied in a system 100 that maintains rules-based virtual world(s). Based on certain criteria associated with the user, system 100 provides users 104 with a virtual object 106 (e.g. Virtual Collectible) and/or points or currency, and/or access to different experiences and services 108 within the system. For example, users 104 can be rewarded with certain Virtual Collectibles 106 or access to a parallel destination 110 based on their skill level in virtual games hosted by system 100, the number and type of Virtual Collectibles 106 they have already acquired, the reputation they have gained as traders or chatters within the virtual world(s), etc. In general, the rules maintained by system 100, and that are checked to provide virtual awards and services to users 104, are designed to promote further activity with the system 100, and to directly and indirectly drive traffic to sites 102 of partners. For example, the user's criteria can be based on the user's monitored and measured activities 112 of users 104 within the virtual world(s), and possibly further based directly or indirectly on specific activities in connection with sites 102 of advertisers or partners and other criteria. Many other types of mechanisms for awarding users and/or providing access to virtual goods and services are possible, as will become apparent from the descriptions below.

According to other aspects, the present invention leverages and expands on the discoveries and functionalities of co-pending application Ser. No. 12/037,019. For example, virtual goods 106 can be embodied by virtual objects described in the co-pending application. Among other things, the co-pending application provides an interactive system that distributes virtual objects (i.e. Virtual Collectibles) to users while they are casually surfing the web. Each Virtual Collectible consists of one or more attributes. Attributes may determine the virtual object's appearance, behavior, value, virtual location, ownership, etc. Virtual Collectibles are virtual objects that are potentially unique.

According to some aspects of the co-pending application, Virtual Collectibles are advantageous over traditional points because they can make the users who own them appear more appealing to other users in a rules-based system. This can be achieved in a number of different ways. For example, each user may have an avatar that represents them as they navigate in the system. Each user may also own other Virtual Collectibles that accessorize the avatar, such as clothing, hats, and facial features. These Virtual Collectibles may attach to a user's avatar or may be associated with a user's profile, virtual home or virtual space. Examples include a user collecting vehicles, weapons, medicine, furniture, mini-games, planets, badges, etc. Owning these Virtual Collectibles can enhance the user's status within the game or social network. By collecting highly sought-after Virtual Collectibles and displaying them for other users to see, a user can obtain recognition of achievement from the community. Highly decorative or rare Virtual Collectibles not only act as status symbols, but they can also be used to personalize the users' avatars, profiles or online virtual spaces. By displaying these Virtual Collectibles or arranging them in a unique combination, users can express and personalize their appearance, as well as decorate their virtual spaces in a pleasing manner.

According to some additional aspects of the co-pending application, certain Virtual Collectibles can be made more difficult to obtain (e.g. rarer, harder to find, less frequently available, or more expensive), and therefore some Virtual Collectibles can be effectively more desirable than others. As a result, the co-pending application allows control over the visual appeal and desirability of the Virtual Collectibles not only by thoughtful aesthetic design but also by controlling the scarcity of the Virtual Collectibles. Controlling the desirability of the Virtual Collectibles enables developers to enhance the entertainment value of the system, as well as enabling partners and sponsors to have a greater control over targeting audiences. For example, where a user's online identity is represented by an avatar, these may be customized by other Virtual Collectibles such as clothing, accessories, hairstyles, etc., certain or all of which can be made more appealing by being more difficult to obtain.

Moreover, according to some further aspects of the co-pending application, Virtual Collectibles can be branded and carry the logos or identifying marks of partners and sponsors. By associating Virtual Collectibles with specific marks and brands, the system can heighten user interest, foster brand recognition and loyalty, and give partners and sponsors the ability to market their products and services more directly. For example, a Virtual Collectible can bear the logo of a sponsor, such as a spaceship Virtual Collectible bearing the Ford logo. By making the Virtual Collectible visually appealing and/or difficult to obtain, greater brand recognition and loyalty can be promoted. Moreover, acquiring such a highly appealing Virtual Collectible can be tied to a sponsor's goal of promoting its products, such as making it available as a prize to one or more users for viewing a promotional video at a dedicated URL in its website.

Generally, the co-pending application offers Virtual Collectibles to users as an incentive to visit partner and sponsor websites. They are often tied to a specific URL. That is, the user will receive the Virtual Collectible merely by requesting that URL via a browser, for example, or by visiting a specific URL and clicking on a specific object placed on top of the webpage that distributes location specific Virtual Collectibles. The co-pending application recognizes that since Virtual Collectibles are desired by the users, in order to drive online traffic to their websites, sponsors may offer a straight award-upon-visit Virtual Collectible to every visitor of a certain web location, or URL.

According to some aspects, the present invention leverages and expands on the Virtual Collectibles distribution techniques of the co-pending application in new and useful ways. For example, in addition or alternatively to automatically awarding certain Virtual Collectibles based on URLs visited by the user, a system according to the invention rewards users based on criteria including their activities, experience and/or skill level within virtual world(s) hosted by the system. User participation in the system is thereby promoted, which can directly and indirectly promote the goods and services of partners.

According to additional aspects, the present invention provides and promotes activities within virtual world(s) while users are already casually surfing the web, and can further make web-surfing itself even more entertaining. For example, the user can casually surf the web, and simultaneously participate in virtual world activities, such as trading Virtual Collectibles, chatting with other users in a virtual world(s), etc. Such virtual world activities can be further promoted through rewards of Virtual Collectibles based on users' status and reputation within the virtual world. Accordingly, in addition to being entertained by receiving a Virtual Collectible, the user will be entertained through the virtual world activities themselves, and the process of potentially acquiring more.

According to further aspects, the present invention also or alternatively leverages and expands upon the functionalities and discoveries of co-pending application Ser. No. 12/118, 533, the contents of which are also incorporated by reference herein in their entirety. For example, on-line services 108 and parallel destinations 110 of the present invention can be implemented using virtual goods, on-line services and parallel destinations described in that co-pending application. Among other things, that co-pending application describes virtual goods and services that can be provided to users when they visit particular partner sites. The co-pending application further describes parallel destinations associated with partner sites that users can access, and which can provide virtual goods, services, entertainment and information that are in addition to or alternative forms of content provided by the partner site.

Services 108 and parallel destinations 110 can include games or activities described in the co-pending application such as puzzles, mazes, multimedia interactions between users' avatars (e.g. sword fights, slime bombs, crazy tape, tossing a ball, firing weapons and dodging/shielding fire, etc.), trivia games, arcade games, word games, social games, games of chance, games of skill, interactive toys and objects, virtual environment games, turn-based games, real-time games, message-based games, web-browsing games, etc. Services 108 and parallel destinations can further or alternatively include services described in the co-pending application such as bulletin boards, voice chat, blogs, classifieds, e-commerce, messaging, games, advertising, file sharing, financial services, mobile services, photos, music, radio, live broadcasts, news and information, job matchmaking, online dating, social networking, search, retail, consulting services, etc.

A method and system of maintaining and promoting virtual world activities, and simultaneously promoting goods and services of partners through rules-based virtual words according to certain aspects of the invention will now be described in detail beginning with FIG. 2.

Figure 2:
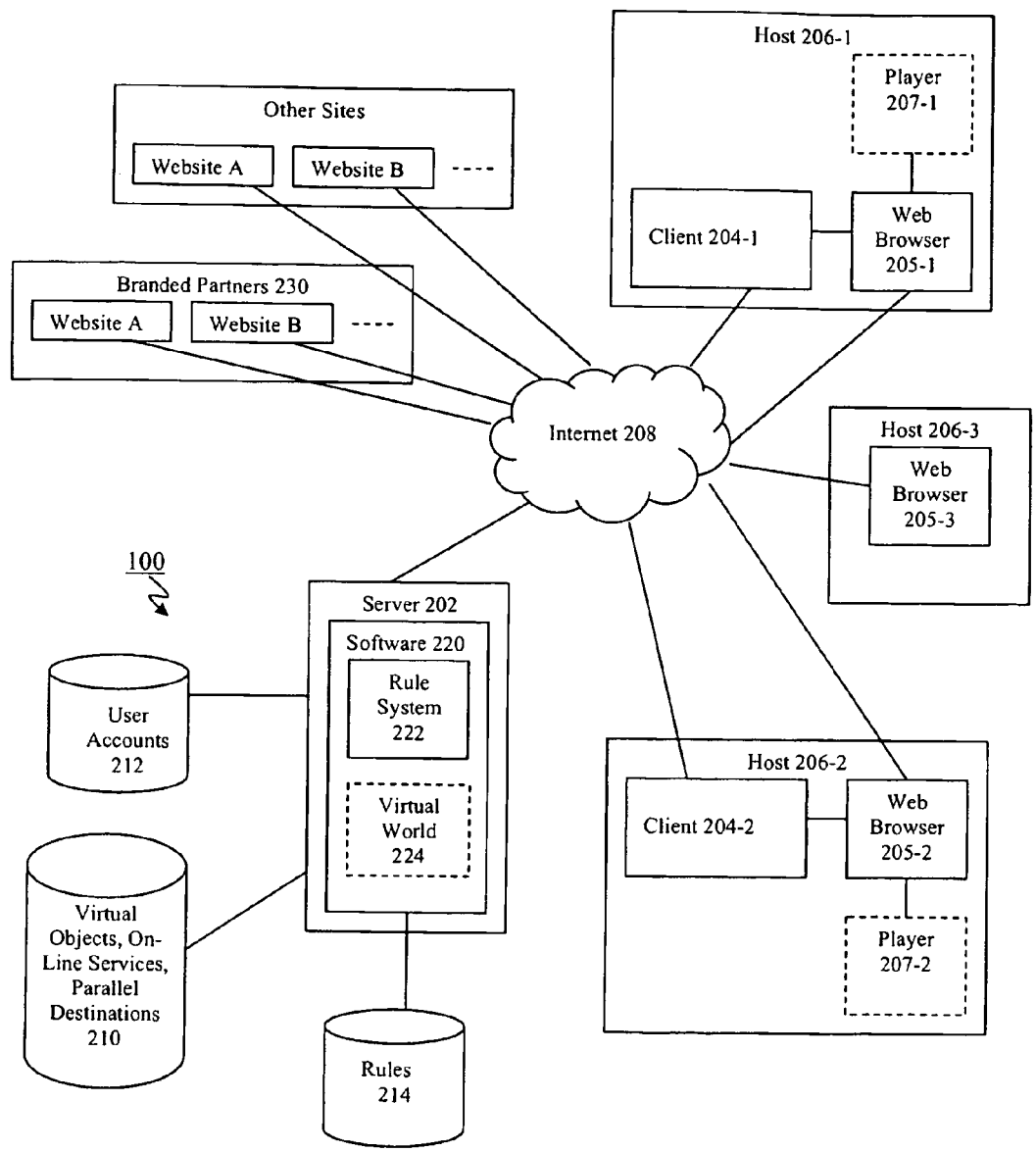
FIG. 2 is a block diagram of a virtual world activity promotions system according to aspects of the invention.

As shown in FIG. 2, a system 100 according to the invention includes server 202 that communicates with clients 204-1, 204-2, etc. having associated hosts 206-1, 206-2, etc. via Internet 208. In embodiments, server 202 can further communicate with hosts (e.g. 206-3) that do not have clients. In general operation, server 202 manages virtual world(s) 224 and further manages and hosts user interactions within it/them. Server 202 further controls user access to virtual goods (e.g. Virtual Collectibles, other virtual objects) and services (e.g. on-line services, games, parallel destinations) 210 primarily based on rules 214 and perhaps in accordance with user activity within the virtual world(s) and associated partner sites 230 communicated by clients 204 to server 202.

Server 202 can be implemented by one or more server computers and associated server software such as those available from Sun, HP, BEA, etc. As shown in FIG. 2, server 202 hosts and maintains a database 210 of virtual objects (including Virtual Collectibles) and services and database 212 of user accounts. It further includes associated software 220 comprising, for example, operating system(s), web server(s), web application(s), database server(s), and other server software. According to aspects of the invention, software 220 at least includes rule system 222 that controls how virtual goods and/or services are provided to users, based on rules 214. As shown, software 220 also includes functionality to present and manage virtual world(s) 224, as well as user interactions within it/them, and to further maintain information about user activities within the virtual world(s).

In embodiments, server 202 maintains a list of Virtual Collectibles belonging to individual users in user accounts database 212, and/or credits, points or other real or virtual currency that can be redeemed or exchanged for Virtual Collectibles. According to aspects of the invention, database 212 can also include information about users (e.g. group/social network memberships, frequent flier memberships, etc.), as well as their activities within virtual world(s) hosted by the system (e.g. reputation, skill level, trading activity, etc.). It should be noted that server 202 can maintain other conventional user account information such as usernames, passwords, contact information, etc., either in database 212 or other locally or remotely accessible storages.

According to aspects of the invention to be described in more detail below, users having clients 204 are provided access to virtual goods and services, for example to participate, and interact with other users, in virtual world(s) hosted by the system, and can be further awarded with Virtual Collectibles by server 202 based on rules 214 and perhaps in further accordance with the users' on-line activities within such virtual world(s) and with partners 230 (e.g. www.ford.com, www.coke.com, etc.) who each have one or more websites accessible by browsers 205. As further shown in FIG. 2, users can also access other websites in addition to partner websites 230.

Hosts 206 are generally any type of computing device a person can now or in the future use to access the Internet or other public network, and which can host at least a client application 204 and Internet access hardware (not shown) and software such as a browser 205. In an example where host 206 is implemented by a personal computer such as a Mac, PC, notebook or desktop computer, host 206 typically includes an operating system such as Windows or Mac OS, a browser application such as Windows Explorer or Mozilla Firefox, and network access hardware such as a wired or wireless modem. Hosts 206 further preferably include graphical displays (e.g. one or more LCD screens) and I/O devices (e.g.

keyboard, mouse, keypad, scroll wheels, microphone, speakers, video or still camera, etc.) for providing a user interface within the operating system and communicating with client application 204. Hosts 206 are not limited to personal computers, but can include cellular phones, personal digital assistants (PDAs), game systems (e.g. Playstation, Wii, Xbox, etc.) or other devices, and those skilled in the art will understand how implementation details can be changed based on the particular type of host device.

Clients 204 are software applications that reside on the hosts and typically execute under the host operating system. The client software application 204 can be either a standalone application, such as a game interface that occupies a large portion of the computer screen when in use, a plug-in that is embedded into another application such as a web browser and occupies very little screen space, or other type of application and/or screen configuration. In general operation to be described below in more detail, the client application monitors the user's on-line behavior, such as the URLs that the user is visiting via browser 205. It sends this information over the Internet to the server, which can use it along with other criteria to make decisions as to whether to provide the user with access to virtual goods and/or services 210.

The client application 204 also preferably provides a graphical interface using the display and I/O devices of host 206 by which the user navigates through, and interacts with other users in, a virtual world. As described in more detail in the co-pending applications, the user may initiate an event requiring server attention, such as a trade request, from the interface. The user may also interact with other users using chat and other conventional and new online communication mechanisms, including but not limited to voice and video communications, hosted by server 202 and within or without the graphical interface provided by the client application. In embodiments, the graphical interface provides a graphical representation of other users in the form of avatars, and can also display the Virtual Collectibles that the user or other users own, either alone or together with their respective avatars. Client application 204 can also interact with server 202 to provide on-line services (e.g. ability to interact in games, auctions, and other on-line activities) to the user.

In one example implementation shown in FIG. 2, where host 206 is a laptop or desktop personal computer, client application 204 is an ActiveX control, browser plug-in, C++ application, Java application, Flash application or similar application or technology, as well as any combination thereof, that operates with browser 205, and has at least the functionality described above and in the co-pending applications, and to be described in more detail below. Host 206 further includes an optional multimedia player 207 such as a Flash Player for use in displaying multimedia content provided by the invention in a multimedia interface. Those skilled in the art will understand how to implement the principles of the invention using such conventional mechanisms after being taught by the below detailed descriptions of the functionality provided by server 202 and client 204, as well as the details in the co-pending applications.

Internet 208 is, for example, the public Internet, but can further or alternatively include any combination of wired and wireless networks, public and private, that are traversed by users who seek access to content on the public Internet, as will be appreciated by those skilled in the art.

Database 210 is maintained by server 202 to include virtual goods and services that can be provided to users, and can include Virtual Collectibles, interactive objects, on-line services, communication services, video and media services, news and information services, games, parallel virtual worlds or spaces, e-commerce objects, etc.

Database 214 is maintained by server 202 to generally include rules controlling how and when virtual goods and services can be provided to users, and can include pointers, rules and/or configurations regarding the provision and rendering of virtual goods and services.

It should be further noted that the depiction of separate storage 210, 212, and 214 for virtual goods and services, user accounts, and rules, respectively, is intended to be representative rather than structural, and that many different forms of local, remote, online, offline, permanent and temporary types of storage are possible, either singly or in combination.

It should be noted that the configuration illustrated in FIG. 2 is intended to be illustrative and not limiting, and those skilled in the art will appreciate various alternative configurations, topologies, etc. For example, while only one server 202 is shown, there may be many servers 202, either in the same location and/or at the same network address, and/or distributed across many locations and/or network addresses. Moreover, server 202, partner 230 sites and other sites, and hosts 206 are typically all remotely located from each other, both physically and with respect to different network addresses such as IP addresses. Many other alternatives are possible, as will become apparent to those skilled in the art.

Figure 3:
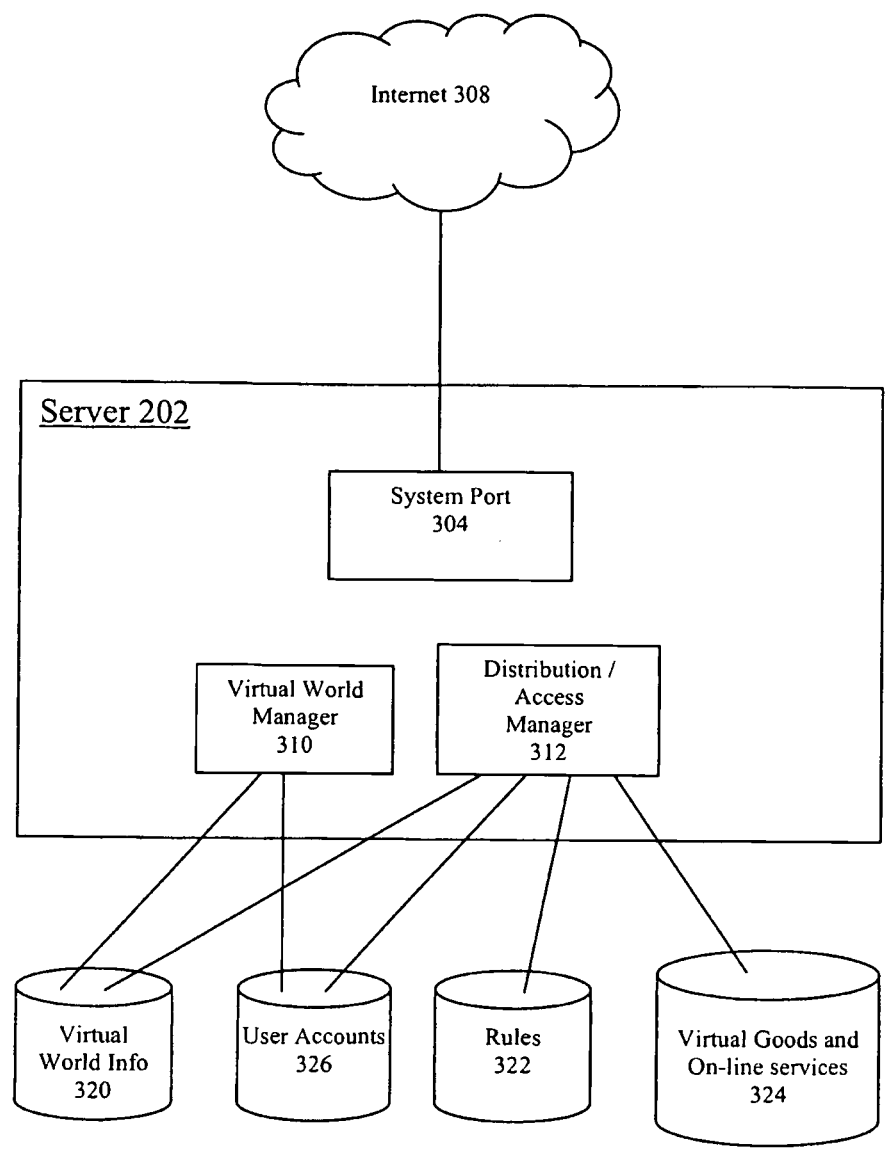
FIG. 3 is a detailed block diagram of an example implementation of a server in a virtual world activity promotions system according to aspects of the invention.

An example implementation of server 202 is illustrated in further detail in FIG. 3. As shown in FIG. 3, server 202 includes system port 304, virtual world manager 310 and distribution/access manager 312. Some or all of processes 304, 310 and 312 communicate with each other over a bus, local or other network (not shown), shared memories, inter-process communications and/or network protocols and can be partially or fully implemented as web applications and/or web server applications, as will be understood by those skilled in the art after being taught about their functionalities described in detail herein and in the co-pending application. As further shown in FIG. 3, server 202 can include one or more processes for managing structured or unstructured data including virtual world info 320, rules 322, virtual goods and on-line services 324 and user accounts 326. In one example implementation, data 320, 322, 324 and 326 are provided in one or more common or separate databases that can be either internally or externally stored.

In general, system port 304 handles communications with clients 204, typically hosted on devices such as PCs. Port 304 can also handle communications with clients 204 hosted on devices such as cell phones and PDAs, or server 202 can include separate ports for handling such communications. It should be apparent that, even with separate ports, these need not be separate processes, but can be provided together in alternative embodiments.

In general operation, port 304 operates to communicate with clients 204 using structured messaging as defined for the appropriate client type, allowing for interaction with server 202 in order to monitor the associated users' activities with partners 230 and/or with virtual world(s) managed by the server 202 and/or to provide access to virtual goods and on-line services 324 and/or other prizes to such users according to rules 322. In a PC example, clients 204 use http methods such as the POST method over TCP/IP and sockets to send information about URLs browsed by web browser 205 (including URLs of partner sites 230) to server 202 via port 304. These and other example implementation details are described in detail in the co-pending applications and/or will become apparent to those skilled in the art based on the following descriptions.

In embodiments, information regarding user activities within the system and virtual world(s) hosted by the system can be maintained by manager 310 in virtual world info 320. Distribution/access manager 312 further monitors users' on-line activities with partners 230 as communicated by clients 204 as described above, activities of users in virtual world(s) as maintained by manager 310, and perhaps other user information (e.g. frequent flier memberships, partner affiliations, etc.) in user accounts 326, and uses some or all of this information to determine how and when to reward users with distribution of one or more virtual goods and/or access to on-line services according to rules 322.

Functionalities for hosting virtual world(s) can include those described in the co-pending applications, as well as those to be described more fully below. For example, the system of the co-pending application Ser. No. 12/037,019 allows users to customize their on-line presence through avatars, screen names and profiles, and further provides chat room functionality for allowing users to interact with other users while casually surfing the web. As described in that co-pending application, users can chat with each other in virtual worlds such as planets associated with partner websites, and/or rooms and worlds that are customized by individual users. Additionally or alternatively, users can chat with each other with graphical representations of each user, along with chat content, overlaid on top of other web contents. Other forms of interaction are possible, such as e-mail, instant messaging, voice or video chat, etc. Further details regarding the functionalities for providing virtual world multimedia content and user interactions can be found in the co-pending application, and will be omitted here for sake of clarity of the invention.

Functionalities for hosting virtual world(s) can additionally or alternatively include those described in co-pending application Ser. No. 12/118,533. As described in that co-pending application and incorporated in the present invention, server 202 can allow virtual objects and services to be overlaid on website content (e.g. web page) of partners 230 that is ordinarily rendered for display by a web browser. These virtual objects can include avatars, virtual collectibles, games or activities and on-line services. The mechanisms for displaying such objects and providing such services are described in the co-pending applications and/or will become apparent from the descriptions herein. Additionally or alternatively, server 202 can provide parallel destinations that can be automatically accessed by users with clients 204 when they visit websites of partners 230. Accordingly, rather than overlaying or embedding virtual goods and/or on-line services together with normal website content, web page(s) having this parallel destination content completely fills the screen and replaces normal web site content of partner 230, or is provided in a separate browser window, for example. Within this parallel destination, virtual objects can be provided, including avatars, virtual collectibles, games or activities and on-line services, as described above. It should be noted that parallel destinations can also include displays of some or all of the content typically provided in websites.

According to some aspects, the rules-based system of the invention expands on and leverages the functionalities of the co-pending applications. For example, rules 322 can include criteria that are designed to encourage and promote user participation in virtual world(s) hosted by the system, and which are further designed to inherently reward users based on their level of participation in on-line activities on websites of partners 230. More particularly, rules 322 can list criteria for distributing virtual goods (e.g. Virtual Collectibles) and/or access to on-line services (e.g. games, parallel destinations) based on how actively and/or well they participate in virtual world activities hosted by the system as determined by manager 310 from information included in data 320, and this virtual world activity can be further directly or indirectly based on how much time they spend on sites of partners 230.

As described in the co-pending application, when a user having a client 204 performs on-line activities, client 204 communicates information related to such on-line activities to server 202. In the present invention, information about such activities, as well as other information collected by the system, is maintained by virtual world manager 310 in data 320. Distribution/access manager 312 determines whether user activity is associated with one of the rules listed in rules 322, and if so, manager 312 can further determine what partner activity, virtual world(s) participation criteria or other criteria associated with the rule are satisfied. Manager 312 can further determine whether the reported and/or recorded activity qualifies the user to receive a virtual good or obtain access to an on-line service from store 324, possibly in addition to other virtual goods and services distributed in accordance with the co-pending applications.

Accordingly, the present invention allows information regarding users' participation in virtual world(s) hosted by the system to be maintained and/or monitored, including by manager 310, and to be further considered for distributing virtual goods and/or providing access to on-line services of the system, rather than simply comparing a URL to a list of URLs, as in the co-pending applications. The rules and/or rewards criteria are typically related to virtual world activities that are deemed to effectively promote user participation in the virtual world(s) hosted by the system, and thereby promote on-line activities with partners 230.

Example implementations of manager 310, manager 312, info 320 and rules 322 according to certain aspects of the invention will become apparent from the above descriptions as well as those in the co-pending application, as well as the following FIGS. 4 to 8. In general, FIGS. 4 to 8 are screenshots illustrating web page and other content served and displayed by server 202 based upon specific selections by users using clients 204, as described in more detail below and in the co-pending application. Details necessary for an understanding of the present invention will be provided below, while other details provided in the co-pending application will be omitted for clarity of the invention.

Figure 4:
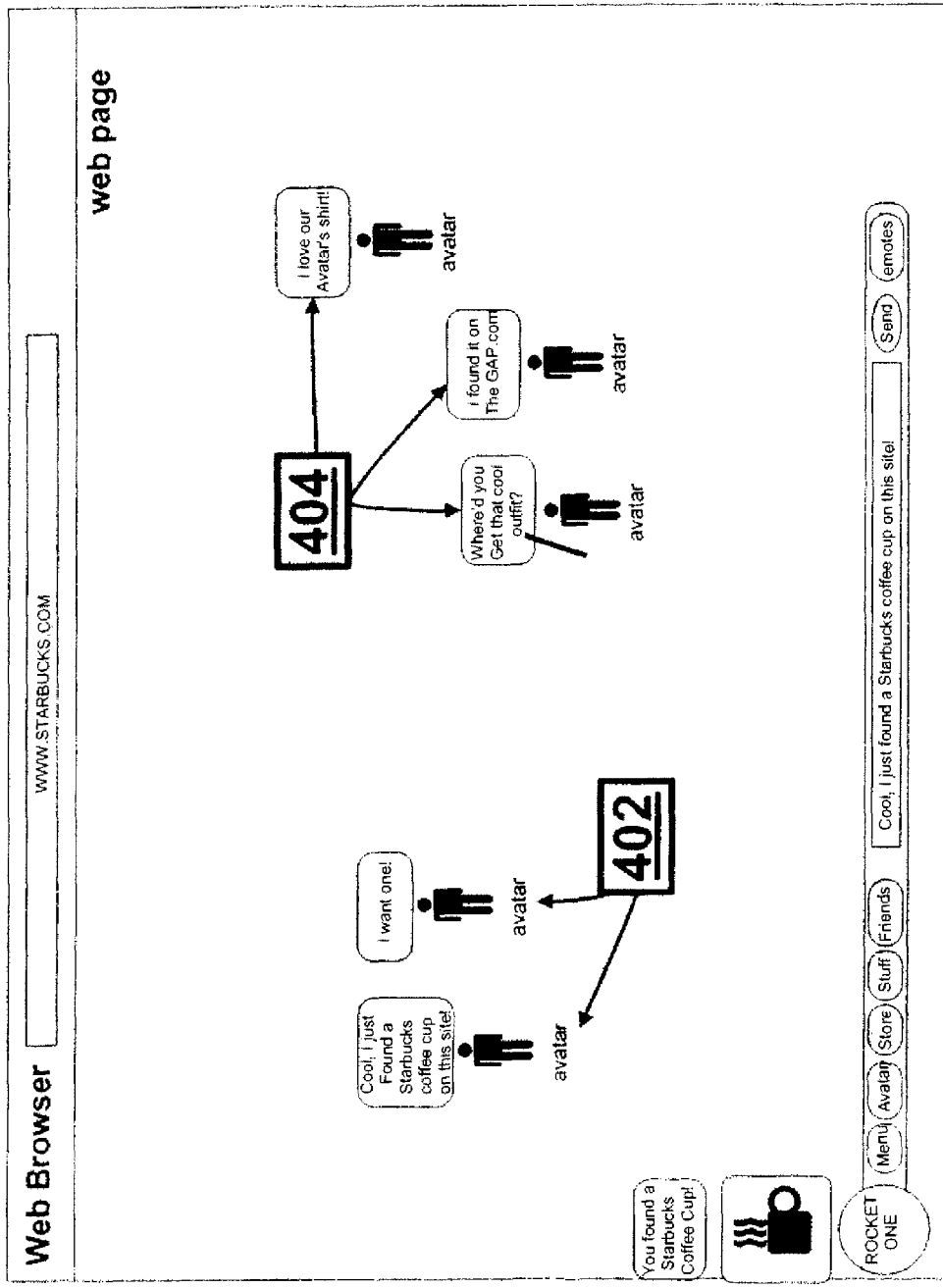
FIGS. 4 to 8 are screenshots illustrating various types of virtual world activities that are monitored and awarded according to example embodiments of the invention.

For example, as shown in FIG. 4, and as described in more detail in the co-pending applications, server 202 allows users to interact with other users in virtual worlds as they casually surf the Internet. More particularly, as shown in FIG. 4, server 202 can cause graphics and other multimedia content associated with virtual worlds to be displayed overlaying browser content for users having a client application 204. In this example, each user's virtual presence is depicted by an avatar 402. Server 202 further provides mechanisms, described in more detail in the co-pending applications, for allowing users to chat with other users in the virtual world, and depicting chat messages 404 in the overlaid content. In accordance with the present invention, however, this activity is captured and maintained by the system and can be used to further determine distribution of virtual goods (e.g. Virtual Collectibles) and/or further access to on-line services.

Figure 5A:
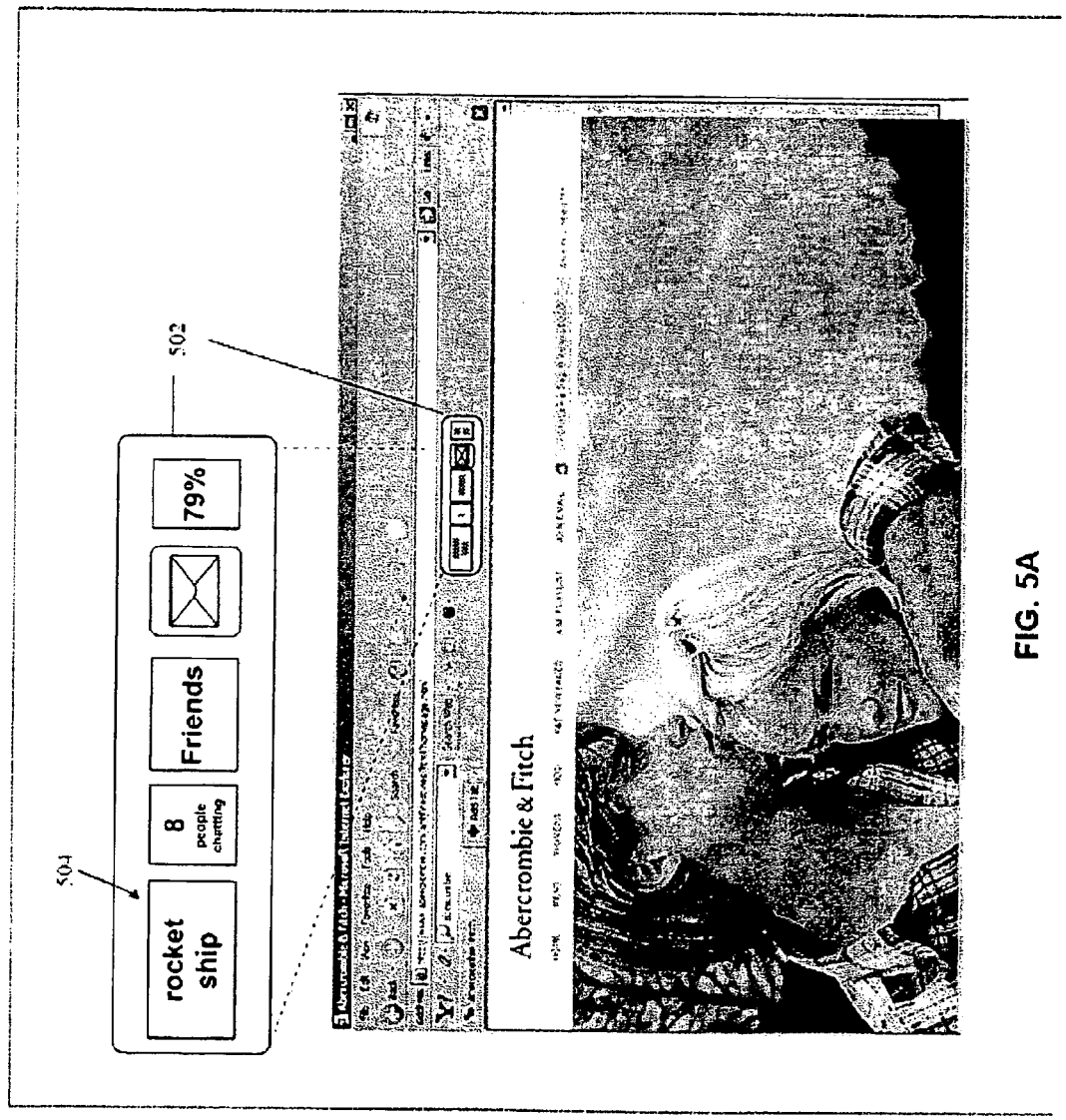
Figure 5B:
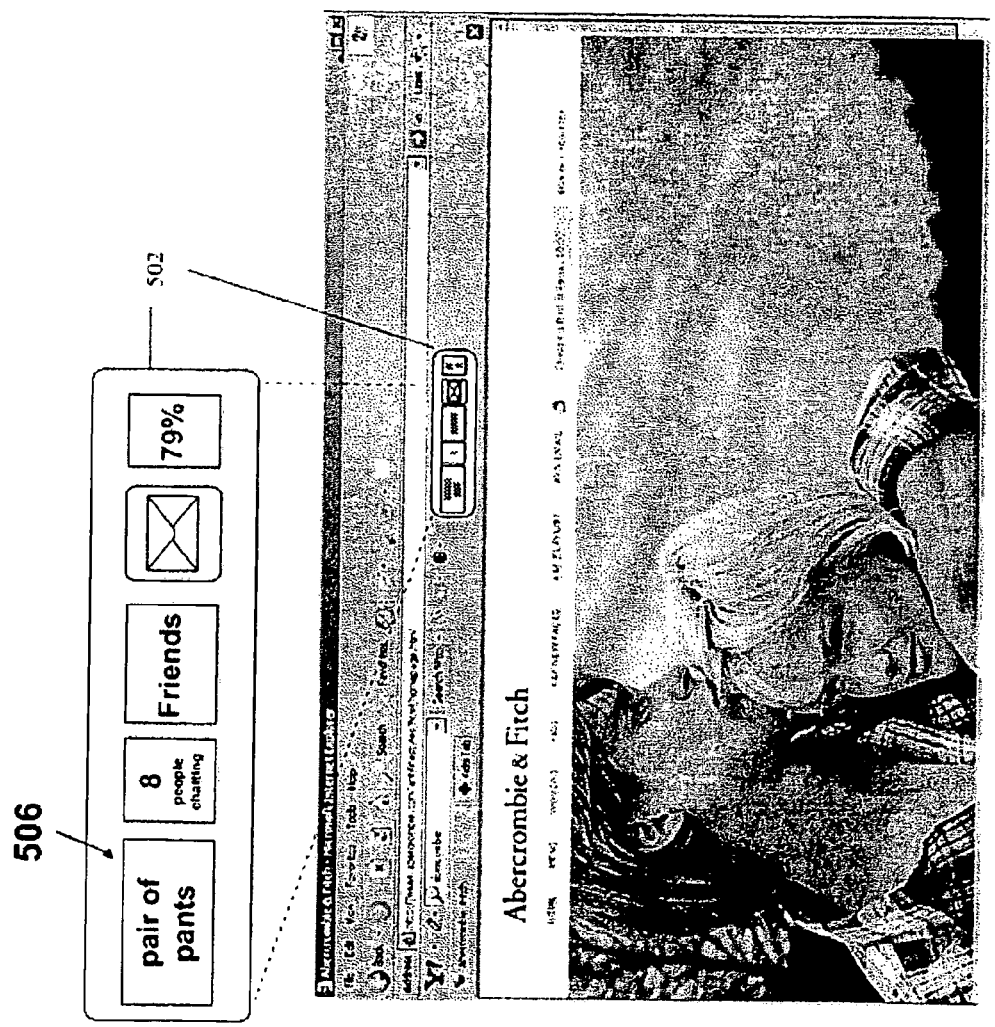

As further described in more detail in the co-pending applications, and as shown in FIGS. 5A and 5B, users having a client application 204 can automatically receive Virtual Collectibles as they casually surf the web. In this example embodiment, client application 204 causes a tray 502 to be displayed in the browser toolbar. The tray includes an icon 504 representing the user's spaceship, which in some embodiments visually depicts the user's transportation and collection vehicle in the virtual world(s) hosted by the system. As shown in FIGS. 5A and 5B, client application 204 monitors the user's on-line activities and communicates certain of these activities to server 202. For example, when the user visits a particular web site of a partner 230 (www.abercrombie.com in this example), the server can determine whether to make a Virtual Collectible available to the user. If so, the spaceship icon 504 in tray 502 is replaced with a Virtual Collectible icon 506, perhaps further in conjunction with other audible or visual alerts.

According to aspects of the present invention, and as an extension of functionalities provided in the co-pending application, server 202 further captures and monitors users' activities within the virtual world(s) hosted by the system, and uses this information to further control access to additional on-line services and/or the distribution of virtual goods (e.g. Virtual Collectibles), as will be described in more detail hereinbelow. For example, the user's past and current collection of Virtual Collectibles can be considered when determining the distribution of new Virtual Collectibles to the user, rather than just being based on URLs visited by the user, as shown in FIGS. 5A and 5B above. Additionally or alternatively, various activities by users in virtual world(s) hosted by the system can take place, and information regarding these actions can be maintained by the system. This information can also be used to determine whether the user is granted access to special on-line services, activities, or virtual goods.

Figure 6:
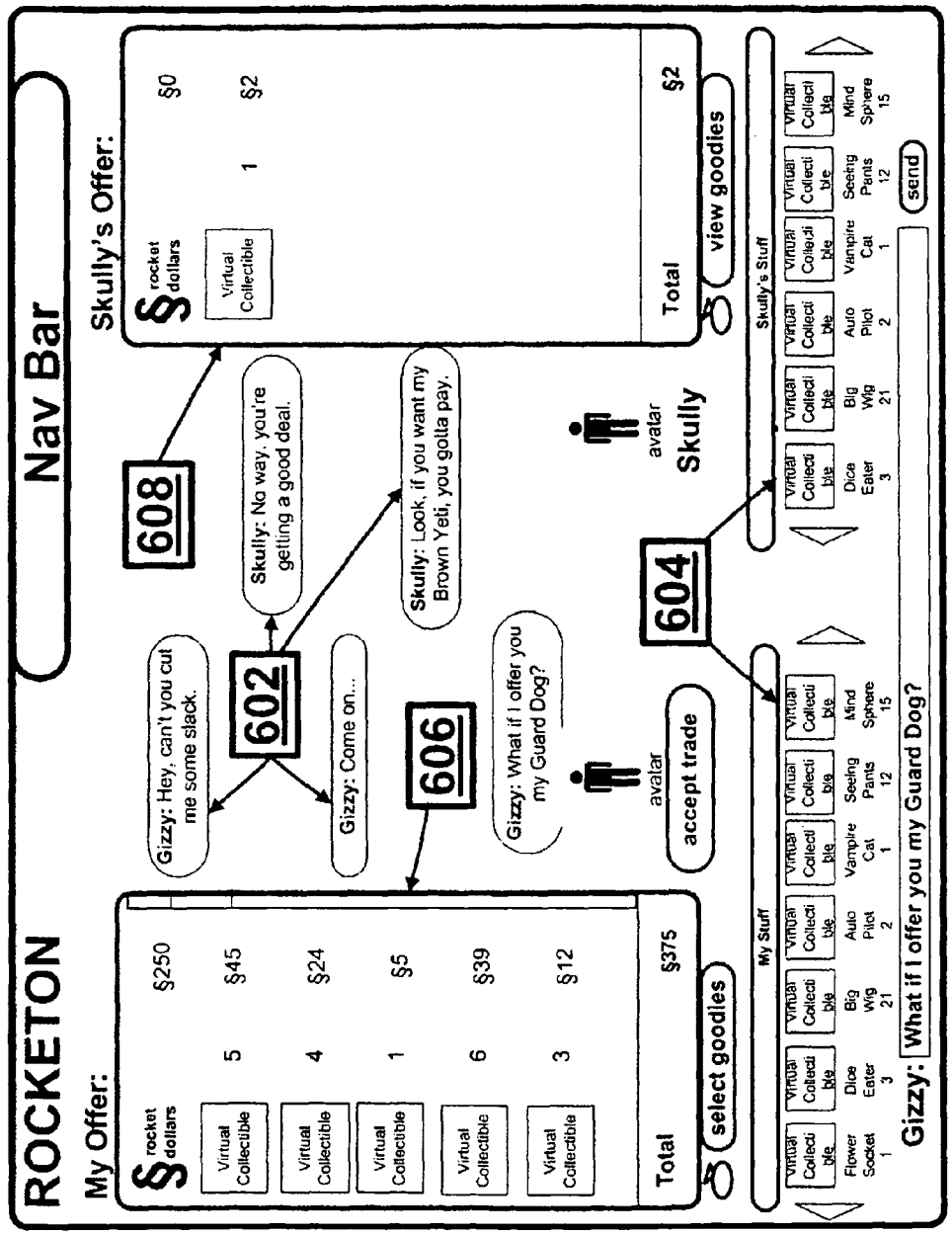

For example, as shown in FIG. 6, and as also described in the co-pending applications, the system can allow users interacting with each other within virtual world(s) to chat and trade virtual goods with each other. As shown in FIG. 6, users who agree to discuss a trade are presented with special trade pages (e.g. by their respective client applications 204 communicating with server 202) where the users can chat with each other and their messages 602 can be displayed on the page. Each user can see their own Virtual Collectibles in their respective boxes 604 and select them for offering to trade. If the user has multiple copies, they can further select the number of copies to include in the trade via a popup for example. Each user is also displayed their current offers in respective boxes 606, 608. As further shown in FIG. 6, one or both of the users can include cash (real or virtual) in the trade. Once users agree on a trade, the system can update their respective accounts with the traded Virtual Collectibles.

Many other types of interactions by users within the system and with other users are possible. According to aspects of the present invention, in addition to hosting such interactions, virtual world manager 310 collects and maintains information about them, and can further determine a relative experience or skill level among users with respect to various interactions. For example, manager 310 can keep a running count of the number of trades a user has completed with other users, and use that to form a relative experience level or status among all users of the system. These and additional examples will become apparent from descriptions below.

Figure 7:
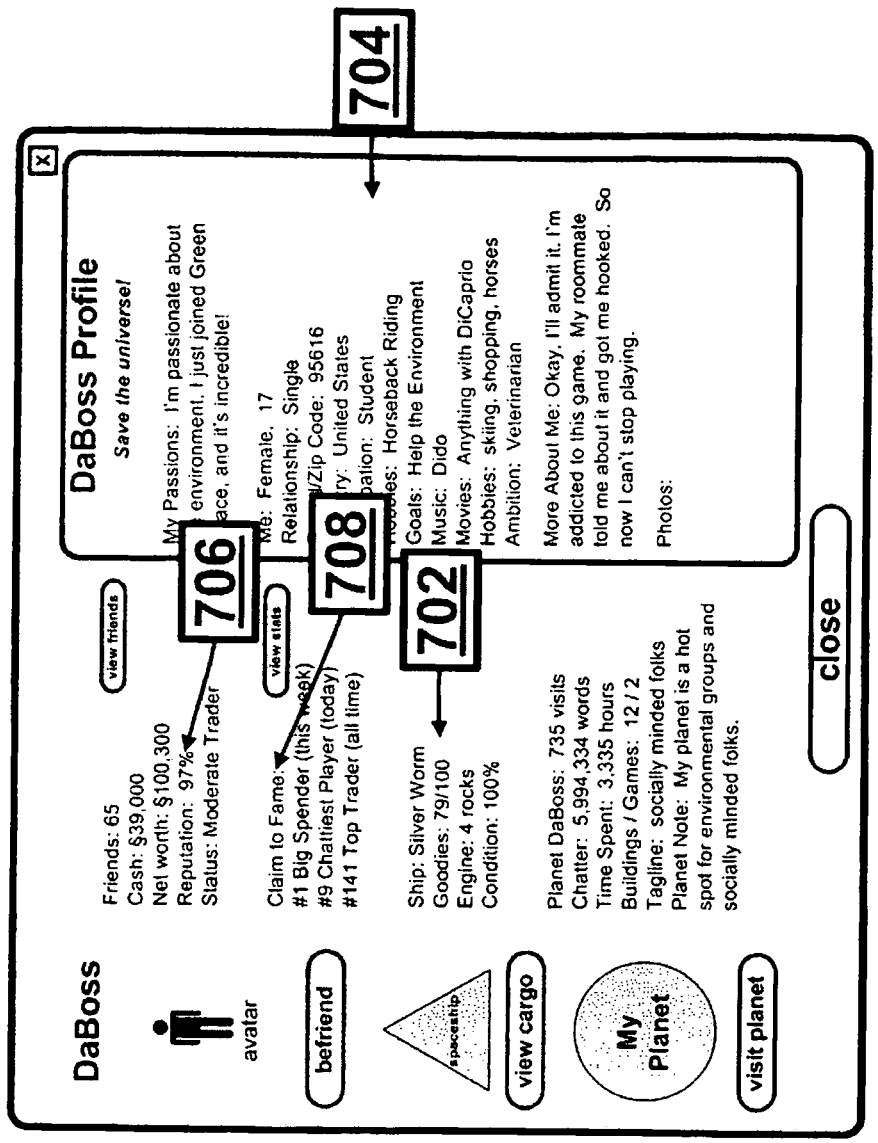

FIG. 7 is a screenshot illustrating an example user profile page that can be generated by server 202 and displayed for a user having a client application 204. FIG. 7 further illustrates certain information regarding the user's virtual world activities that can be maintained by server 202 (e.g. virtual world manager 310) according to aspects of the invention. As shown in FIG. 7, a user's profile can include account information 702 indicating the amount of real or virtual funds the user has in his/her account and the number and type of Virtual Collectibles the user has. The user's profile can further include social networking information 704 that includes personal details, the number of visits other users have made to the user's home page or virtual planet, and the amount of activity (e.g. words typed in chat, time spent, etc.) on the user's home page or virtual planet.

As still further shown in FIG. 7, along with account and social network information, the user's profile page can include virtual world status information 706 that is calculated and/or maintained by the system according to aspects of the invention. For example, as shown in FIG. 7, the status information include a user's trading reputation and status (e.g. reputation of 97%, and status as "Moderate Trader"). This information can be compiled in a number of ways, for example by keeping a running count of the number of trades the user has made, determining the frequency of trades over a given period of time, soliciting and/or obtaining reviews from trading partners, etc. Returning again to FIG. 7, the user's profile page can further include virtual world activity statistics 708. This can include the user's ranking among all system users in a number of categories over a given period of time, for example the money the user has spent for Virtual Collectibles in a given time, the quantity of chat activity, the number of trades, the number of friends made, community/reputation ratings, experience level, etc. It should be apparent that the displayed statistics in a user's profile may only be a subset of the number and types of statistics that can be maintained by the system for each user based on their activity in virtual world(s) hosted by the system.

Figure 8:
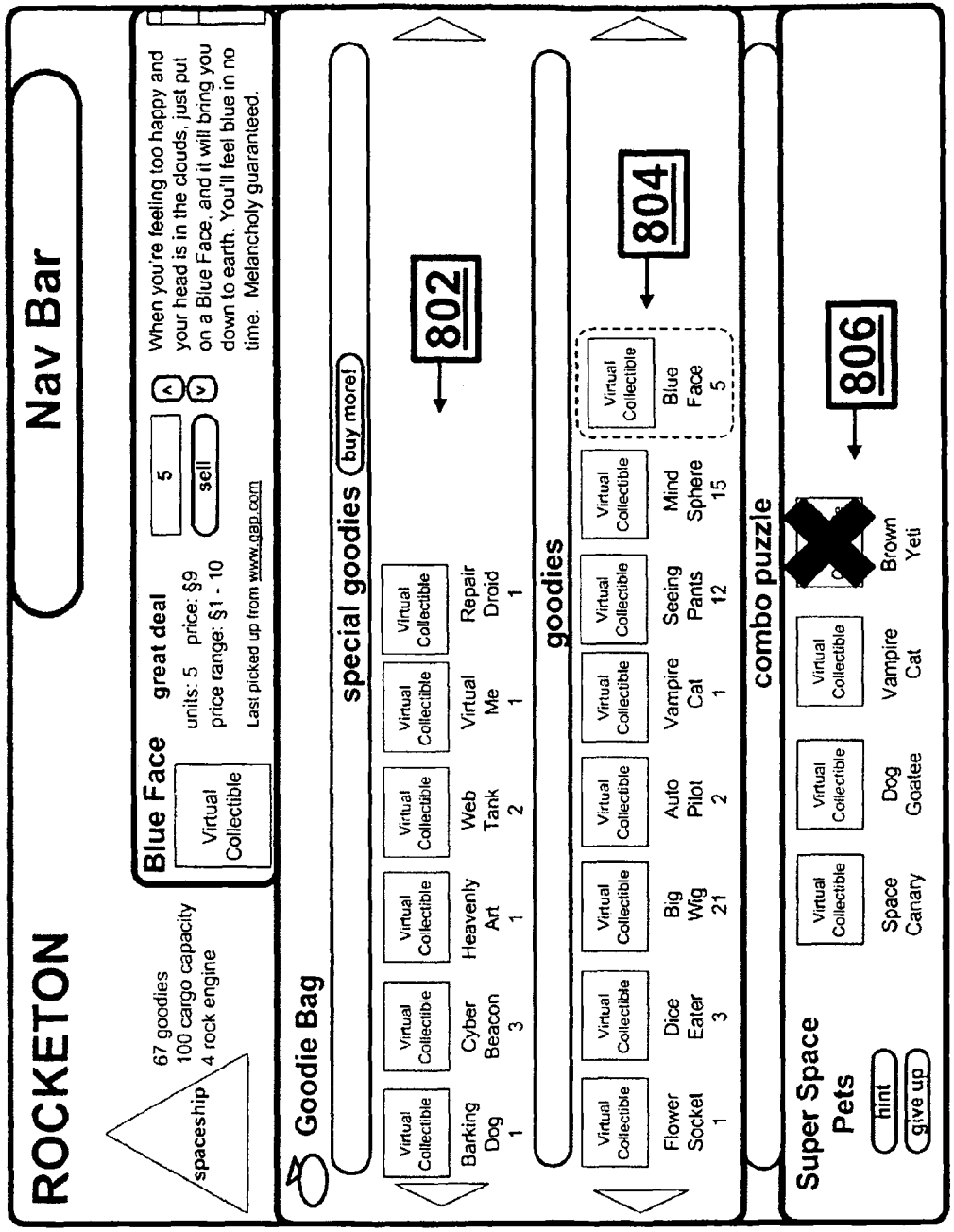

FIG. 8 further illustrates additional types of user information that can be maintained and used by the system according to embodiments of the invention. As described in the co-pending application and shown in FIG. 8, user information can include the Virtual Collectibles the user has already acquired, including those automatically distributed to the user, and those purchased or traded for by the user. As shown in this example, a user's Virtual Collectibles are held in a user's personalized virtual "space ship," as described in more detail in the co-pending application. The user's Virtual Collectibles in this example embodiment include "special goodies" 802 and "goodies" 804. Special goodies may have special powers that may enhance the user's status and abilities such as fighting strength, where they may include objects such as a magical sword, or something with special functionality that may assist users to initiate interactions with other users, such as a barking dog that may alert the owner of the dog when his/her friends visit a specific URL. In this example embodiment, regular goodies may be clothes for the avatar, such as a hat, an outfit, handbag, bouquet of flowers, etc. As further shown in FIG. 8, the user's Virtual Collectibles can also include "combos" 806 that are used in games and/or have special enhanced value when an entire set is collected, as explained in more detail in the co-pending applications and also in co-pending application Ser. No. 12/111,916, the contents of which are incorporated herein by reference in its entirety.

It should be apparent that the system can also maintain additional user-specific information that can be used (e.g. by manager 312) to tailor a user's experience with the system and/or access to virtual goods and services. For example, the user information can contain the user's affiliation with partners, such as loyalty points, frequent flier information, membership information, preferred status, purchase history, etc. Moreover, in some embodiments, the system can maintain user-specific information regarding on-line activities, some or all of which can be further used (e.g. by manager 312) to tailor a user's on-line experience. Such information can include sites visited, purchases made, surveys entered, videos viewed, number of times visited and time spent on specific URL, games played, etc.

Returning to FIG. 3, and as mentioned above, the virtual world manager 310 captures and monitors users' activities within the virtual world(s) hosted by the system, and maintains this information in virtual world statistics 320. Accordingly, with reference to the previous screenshots, this information can include information about users' experience with trades, chatting, reputation and other activities.

According to aspects of the invention, distribution/access manager 312 can use information in 320 to further tailor the user's virtual world experience (e.g. through the provision of virtual goods and access to on-line services). Alternatively or additionally, the information considered by distribution/access manager 312 can include additional user-specific information in accounts 326 and/or information about the user's current and past collection of Virtual Collectibles, as maintained in accounts 326. In general, distribution/access manager 312 accesses rules 322 to determine what information from 320 and 326 is needed at any given time, and to make its determinations regarding the provision of virtual goods/providing access to on-line services.

For example, as shown in Table 1 below, rules 322 can provide a list of criteria, and distribution/access manager 312 can tailor a user's experience depending on whether the criteria are satisfied.

TABLE 1

| Rule | Virtual Good/Service | Criteria |
| --- | --- | --- |
| 1 | Ford spaceship | Any visitor at www.ford.com who performs a chat with other users |
| 2 | Avatar headband | Visitors to www.gap.com and www.abercrombie.com who already own an avatar jogging suit Virtual Collectible |
| 3 | Feed the pet game | Visitors to www.pets.com who are in the top half of experienced users |
| 4 | Cyber Beacon | Any user who performs any activity between 1 pm-2 pm on a specific date, and who is in the top 10% of traders |
| 5 | On-line Fashion show | Visitors to www.nordstrom.com who have made a purchase via the website within the last 60 days |
| ... | ... | ... |
| N | Blue Yeti | 5% of visitors to www.coke.com |

Accordingly, with reference to aspects of the invention and Rule 1 above, virtual goods and/or services can be awarded based on certain pre-defined user activities in virtual world(s) hosted by the system. In the example in TABLE 1, when a user visits any page on www.ford.com, and when this activity is reported by client 204 to server 202, the system can further determine whether the user is engaging in any chat activity while visiting such pages, such as in the overlaid chat content shown in FIG. 4. If so, a Ford spaceship Virtual Collectible can be awarded to the user.

With reference to further aspects of the invention illustrated by Rule 2 above, virtual goods and/or services can be awarded based on users' past activities and current or past collections of Virtual Collectibles. For example, as shown in TABLE 1, any user who visits either www.gap.com and www.abercrombie.com, as reported by client 204 to server 202, and who already owns an avatar jogging suit Virtual Collectible, will also be eligible to receive an avatar headband Virtual Collectible.

With reference to further aspects of the invention illustrated by Rule 3 above, access to services, in addition to or alternatively to virtual goods such as Virtual Collectibles can be tailored via the rules-based system. For example, the determination of whether to provide a particular on-line service can be based on users' experience or skill level within the system. As shown in the example Rule 3 in TABLE 1, any user who visits www.pets.com, as reported by client 204 to server 202, and who are in the top half of experienced users, will be provided with content related to an on-line "Feed the Pet" game, where the user is presented with content (e.g. graphical objects, animations, etc.) related to virtual pet(s), and if the user finds the appropriate pet food for the virtual pet(s), they can win a prize.

With reference to further aspects of the invention illustrated by Rule 4 above, virtual goods or services can be awarded completely without regard to any URLs visited by users, and instead based on users' experience or skill level within the system, and perhaps in consideration of other non-URL criteria. For example, as shown in TABLE 1, any user who performs any on-line activity within a certain time on a certain date, as reported by client 204 to server 202, and who are in the top 10% of traders within the system, will be eligible to receive a cyber beacon Virtual Collectible.

With reference to further aspects of the invention illustrated by Rule 5 above, access to services, including those provided in parallel destinations, can be tailored via the rules-based system. For example, the determination of whether to provide a particular on-line service through a parallel destination can be based on users' activities or affiliations with a partner site. As shown in the example Rule 5 in TABLE 1, any user who visits a partner 230 site such as www.nordstrom.com, as reported by client 204 to server 202, and who have recently made a purchase via the site (perhaps as monitored by manager 310 and stored in data 320), will be allowed access to an on-line fashion show. The show can be presented in a parallel destination associated with the partner site, and can include content (e.g. graphical objects, avatars, animations, live or recorded video, etc.) related to specific clothes and/or accessories that the user can purchase for a discount.

With reference to further aspects of the invention illustrated by Rule N above, Virtual Collectibles can be awarded to any user based on other pre-defined criteria, with or without regard to any URLs visited by users. For example, as shown in TABLE 1, the system counts every time any user visits www.coke.com, as reported by client 204 to server 202. Every $20^{th}$ visitor (either consecutively or on average) will be eligible to receive a Blue Yeti Virtual Collectible.

It should be noted that the example rules provided above are intended for illustration rather than limitation, and many other alternatives and examples of rules for tailoring a user's experience through virtual goods with regard to user activities, status and presence in virtual world(s) hosted by the system will become apparent to those skilled in the art after being taught by the present disclosure. Moreover, such rules may provided together with, or need not be based on user activities, status and presence, but can be related to other criteria including those described in the co-pending applications. For example, virtual goods and/or services can be provided: (a) automatically based on URL visited; (b) randomly based on URL visited; (c) according to a type of good or service associated with the URL visited; (d) within a certain timeframe; (e) depending on the frequency at which a user returns to the same URL; (f) the number of goods and services already obtained at a given URL; (g) depending on a number of times that the user has already visited the URL before; (h) based on the user's affiliation with the partner associated with the URL (e.g. where the partner is United Airlines, and the URL is www.ual.com, the provision of virtual goods and/or services can depend on whether the user is a UAL frequent flier); and (i) whether the partner has any special promotions associated with the URL. The range of possibilities is nearly endless as will be appreciated by those skilled in the art.

It should be further noted that where rules include URLs visited by users as part of their criteria, these URLs can contain wild cards to accommodate random-generated and ranges of URLs. For example, an entry may exist in the pool where "www.amazon.com/userid=*/shop.php," where the asterisk can be replaced by any string. This eliminates the need to store thousands of similar URLs.

Returning to FIG. 3, and as described in more detail in the co-pending application, virtual goods and services (including Virtual Collectibles) are stored in database 324 as pointers to one or more objects that may contain animations, sound, graphics and specific functionality within a game or rules-based system. Virtual goods and services can be as simple as graphics files. For example, a Virtual Collectible could be a .GIF, .JPG, .BMP or .PNG file corresponding to a static image when rendered on a host computer. Virtual goods and services can further or alternatively include one or more animation files, such as an animated .GIF file or a Flash animation. Virtual goods and services can also further or alternatively include any sort of media file, including any type of audio or movie file, such as MP3, .AVI, .SWF, .MPG, .WMV, .WAV, etc. In such cases, content associated with virtual goods and services can typically be downloaded or streamed to users via port 304 and clients 204 via conventional protocols such as http and rendered on hosts using conventional browser functionality and/or functionality in optional multimedia players such as Flash.

It should be noted that server 202 preferably includes an administrator interface (not shown) and associated functionality to manage various aspects and operations of the system. For example, server 202 can allow an administrator to upload and change Virtual Collectibles, their attributes, configure game rules and promotions, and game prizes. Server 202 can further allow an administrator to change and configure web pages and/or parallel destinations and other content served by the server.

It should be further noted that in alternative embodiments server 202 need not include all the components and functionality shown in FIG. 3, or can include other server and/or network components and functionality not shown in FIG. 3, such as load balancers, firewalls, switches, gateways, etc. Moreover, those skilled in the art will appreciate that server 202 and/or certain or all of the components shown in FIG. 3 can be implemented by several different computers, either locally or remotely located, and communicating with each other via a bus, network, etc. It should be still further noted that server 202 can include functionality described in co-pending application Ser. Nos. 12/106,925 and 12/111,916, the contents of which are incorporated herein by reference, to the extent not detailed herein.

Those skilled in the art will be able to understand how to implement the various mechanisms to be incorporated into virtual world manager 310, distribution/access manager 312 and/or client 204 for tracking virtual world and other on-line activities and/or determining whether such activity meets or matches award criteria after being taught by the present specification and the details of the co-pending application.

As further shown in FIG. 3, and described in the co-pending application, when distribution/access manager 312 determines that a user's activities or other user-specific information meets or exceeds criteria in rules 322, an associated virtual good and/or service 324 or other award can be made available to the user. If the user accepts and/or acknowledges the award, distribution/access manager 312 can further control the provision thereof, including updating the user's account in database 326 to associate a Virtual Collectible, points and/or real or virtual currency with the user, if appropriate.

Figure 9:
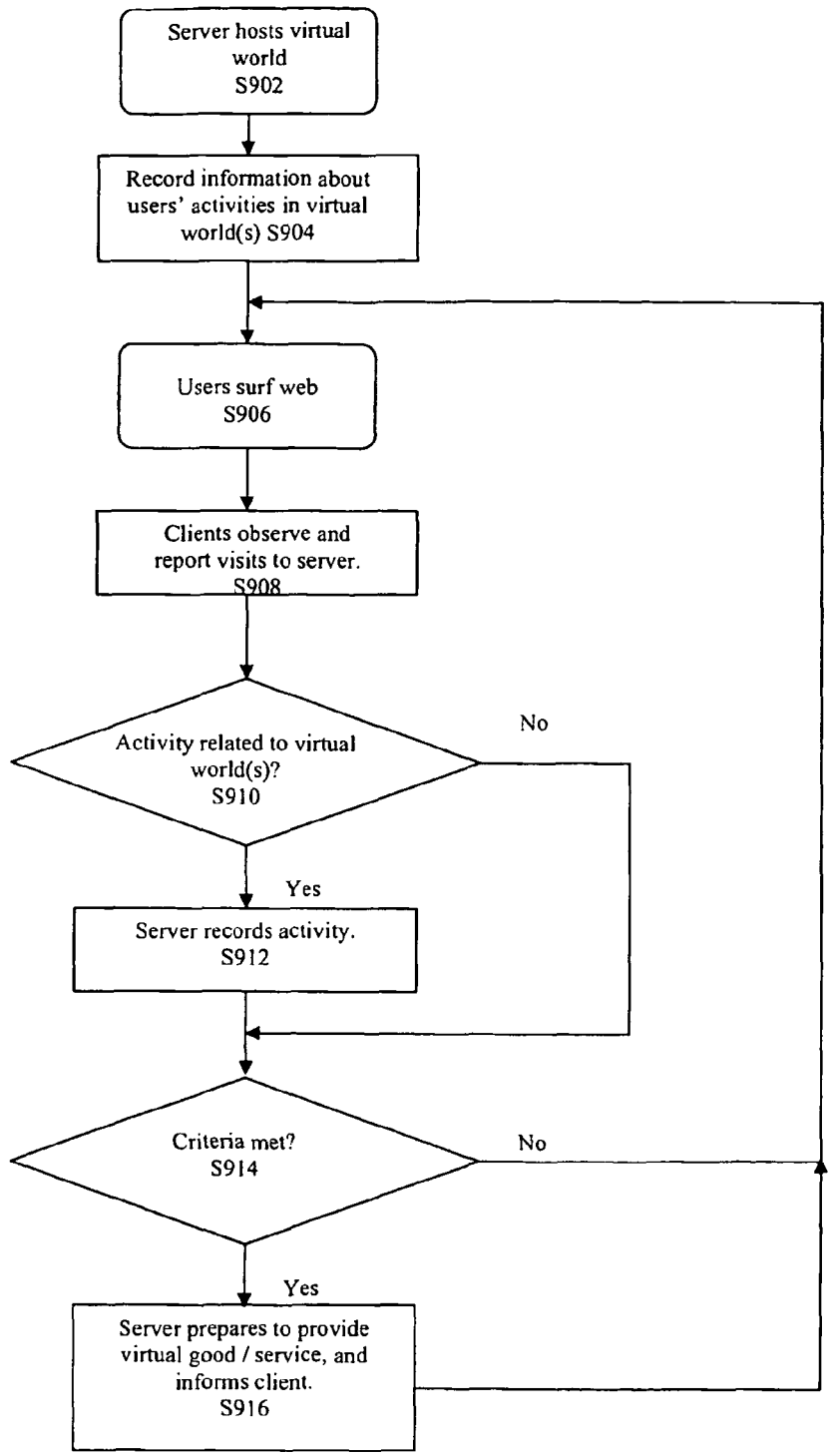
FIG. 9 is a flowchart illustrating an example method for promoting virtual world activities using rules and awards such as Virtual Collectibles that can be implemented in a system according to aspects of the invention.

FIG. 9 is a flowchart showing an example process that can be implemented by server 202 to promote virtual world activities and/or to drive on-line traffic to partner sites using rules-based virtual worlds maintained and hosted according to the invention.

As shown in FIG. 9, in step S902, server maintains one or more virtual world(s). For example, functionalities for hosting virtual world(s) can include those described in the co-pending application, as well as those described in connection with the screenshots above. For example, the system of the co-pending application allows users to customize their on-line presence through avatars, screen names and profiles, and further provides chat room functionality for allowing users to interact with other users while casually surfing the web. As described in the co-pending application, users can chat with each other in virtual worlds such as planets associated with partner websites, and/or rooms and worlds that are customized by individual users. Additionally or alternatively, users can chat with each other with graphical representations of each user, along with chat content, overlaid on top of other web contents. Other forms of interaction are possible, such as e-mail, instant messaging, voice or video chat, etc.

Then in step S904, information about users' activities within virtual world(s) hosted by the system is maintained. For example, manager 310 can record and maintain information about when and how actively users chat with other users in virtual world(s) hosted by the system in data 320. Similarly, manager 310 can record and maintain information about when and how actively users trade or attempt to trade Virtual Collectibles with other users in data 320. Moreover, manager 310 can determine and maintain each user's individual trading reputation and status. This information can be compiled in a number of ways, for example by keeping a running count of the number of trades the user has made and ranking this running total among all users, determining the frequency of trades over a given period of time, soliciting reviews from trading partners, etc. Additionally or alternatively, manager 310 can determine the user's ranking among all system users in a number of categories over a given period of time, for example the money the user has spent for Virtual Collectibles in a given time, the quantity of chat activity and the number of trades. It should be apparent that these and many other types of information can be maintained by manager 310 for each user based on their activity in virtual world(s) hosted by the system, as well as any other user-specific on-line activities and information.

As shown in FIG. 9, in step S906 users having clients 204 surf the web as usual. In step S908, in accordance with pre-determined events, such as when a user visits a new URL, the client 204 notes this activity and transmits this information to the server 202. For example, client 204 can monitor whenever a new URL is typed into browser 205, or when a link to a URL having a different domain name than the current page is clicked. The client 204 may also maintain a memory of the last known URL visited and use that to compare to the new URL. The new URL is transmitted by client 204, along with other information such as the user's identity, to port 304 using http methods and TCP sockets, for example. It should be appreciated that this communication can take place without the user's awareness.

In step S910, manager 312 of server 202 determines whether the reported activity is related to one of the rules in rules 322. For example, manager 312 first compares the URL against URLs listed in any of the rules in store 322 to look for a match. If there is a match, processing advances to step S912 where the manager 312 records the activity in database 320. Next, in step S914, manager 312 reviews the criteria in the matching rule to determine what, if any, virtual good and/or service can be provided to the user. As set forth above in connection with TABLE 1, the criteria can include a variety of parameters that are related to virtual world activities that manager 310 can monitor and/or maintain in store 320. In some embodiments, manager 312 can further retrieve recorded activities in store 320 and/or consult the user's own account information in store 326 to determine whether the criteria are met.

If manager 312 in step S914 determines that the criteria for the associated rule indicate that virtual good and/or service should be provided to the user, processing advances to step S916. It should be noted that the progression of steps shown in FIG. 9 may be varied and/or reduced or increased in some embodiments or situations. For example, after a user comes to a specific URL, the user may be qualified to receive something (i.e., advance from S906 all the way down to S916). However, the user may not surf the web right away. Instead, the user may stay on the same URL and try some other activities available on that URL—such as playing URL specific game, etc., and by doing so, the user may qualify to receive another virtual good/service before surfing to another site. Many other variations and options are possible, as will be understood by those skilled in the art after being taught by the present disclosure.

In step S916, manager 312 retrieves information regarding the associated virtual good and/or service from store 324. If the rule specifies provision of a Virtual Collectible, manager 312 can further associate information regarding the Virtual Collectible in the account for the user in store 326. For example, where the Virtual Collectible is stored as an object in database 324, manager 312 can add a pointer or object ID index to a list of Virtual Collectibles in the user's account information in database 326.

Server 202 (e.g. through port 304) then communicates with client 204 to provide the user with the virtual good and/or service and/or the option to accept or reject it. For example, server 202 can send data, text and/or multimedia content to client 204 and client 204 can correspondingly present a message on the host device's output component, such as a computer screen or a cell phone screen, or provide another indicator (e.g. a tone or buzz) indicating that a new virtual good and/or service is available for the user. Note that in some embodiments, the user need not immediately view content related to the virtual good and/or service, although typically the user will want to view something, which can be done either automatically, or in response to a user selection such as a mouse click. The actual processes and mechanisms that are used to enable a user to view and or perceive content associated with the virtual good and/or service are described in more detail in the co-pending applications.

It should be apparent that the invention thus can effectively encourage users to participate in virtual world activities hosted by the invention, and thereby directly or indirectly drive traffic and promote on-line activities to partners who advertise and promote their goods and services via the Internet. Meanwhile, in addition to allowing users to be entertained by receiving a virtual good and/or service merely by surfing the web at their own leisure, the companies associated with the online activities performed by the user, and for which the user was rewarded, can be positively remembered by the user. Still further, based on the experience of receiving a virtual good and/or service at the company's web site, the user may be more inclined to purchase goods or services from the company.

The example implementations described above should be considered illustrative rather than limiting, and many combinations, divisions, deletions, alterations and supplementations even within the above described implementations are possible, as should become apparent to those skilled in the art.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A method, comprising:
hosting a rules-based virtual world by a computer-based server system that manages avatars and on-line presences respectively corresponding to a plurality of users registered with the rules-based virtual world, wherein a user of the plurality of users interacts with other users of the plurality of users with virtual world content including their respective avatars and on-line presences via a client application that communicates with the computer-based server system;
maintaining information about the user's level within the rules-based virtual world, wherein the user's level is based on a comparison of one or more attributes of the user and rules associated with the virtual world;
allowing the user, while the user is not accessing the rules-based virtual world via a web browser that is separate from the client application, to surf the web and receive normal web content different from the virtual world content, wherein the normal web content is served from a website on the public Internet, and wherein the virtual world content is served from the server system that is separate and remote from the website;
automatically capturing, using the client application, a request from the user to receive the normal web content;
communicating the request from the client application to the computer-based server system; and
automatically supplementing the normal web content that the user receives via the web browser with additional virtual world content from the rules-based virtual world via the client application based on the maintained information and in response to the request, thereby causing the user to simultaneously receive and render using the web browser the normal web content from the website and the additional virtual world content from the server system, the additional virtual world content including at least the avatar corresponding to the user.

2. A method according to claim 1, wherein the maintaining step includes monitoring the user's level of participation in virtual world activities hosted by the system relative to other users.

3. A method according to claim 1, wherein the maintaining step includes monitoring the user's reputation level among other users of the system.

4. A method according to claim 1, wherein the maintaining step includes monitoring the user's level of interaction with other users of the system.

5. A method according to claim 1, wherein the maintaining step includes monitoring the user's skill level in virtual world activities hosted by the system relative to other users.

6. A method according to claim 1, wherein the maintaining step includes determining the user's level of affiliation with a partner of the system.

7. A method according to claim 6, wherein the affiliation level includes one or more of membership in the partner's loyalty program, amount of purchases made from the partner, number of visits made to the partner's website, amount of time spent on the partner's website, number of pages visited on the partner's website, and level of participation in on-line activities hosted by the partner via the partner's website.

8. A method according to claim 1, wherein the maintaining step includes monitoring the virtual goods already possessed by the user.

9. A method according to claim 1, wherein the automatically supplementing step includes allowing the user to participate in certain virtual world activities exclusive of other users of the system.

10. A method according to claim 1, wherein the automatically supplementing step includes allowing the user to access virtual spaces in the virtual world exclusive of other users of the system.

11. A method according to claim 1, wherein the automatically supplementing step includes providing the user with a virtual object that can be accessed and used in the virtual world.

12. A system, comprising:
  a virtual world manager that hosts a virtual world having virtual world content and manages avatars and on-line presences respectively corresponding to a plurality of users registered with the virtual world, wherein the virtual world manager also maintains information about a user's level within the system, wherein the user's level is based on a comparison of one or more attributes of the user and rules associated with the virtual world, and wherein the user interacts with other users of the plurality of users with virtual world content including their respective avatars and on-line presences in the virtual world via a client application that communicates with the computer-based server system;
  a port that receives information from the client application regarding normal web content different from the virtual world content the user requests using a web browser that is separate from the client application while the user is not accessing the virtual world via the web browser, wherein the normal web content is served from a website on the public Internet, and wherein the virtual world content is served from the server system that is separate and remote from the website; and
  a distribution manager that determines whether to automatically supplement the normal web content that the user receives via the web browser with additional virtual world content from the rules-based virtual world via the client application based on the maintained information and in response to the request, thereby causing the user to simultaneously receive and render using the web browser the normal web content from the website and the additional virtual world content from the server system, the additional virtual world content including at least the avatar corresponding to the user.

13. A system according to claim 12, wherein the additional virtual world content includes content that enables the user to participate in certain virtual world activities exclusive of other users of the system.

14. A system according to claim 12, wherein the additional virtual world content includes content that allows the user to access a virtual space in the virtual world exclusive of other users of the system.

15. A system according to claim 12, wherein the additional virtual world content includes a virtual object that the user can access in the virtual world.

16. A method comprising:
  hosting a rules-based virtual world by a computer-based server system that manages avatars and on-line presences respectively corresponding to a plurality of users registered with the rules-based virtual world, wherein a user of the plurality of users interacts with other users of the plurality of users with virtual world content including their respective avatars and on-line presences via a client application that communicates with the computer-based server system, wherein interacting includes displaying the avatars and the other virtual world content on host computing devices associated with the user and other users;
  maintaining information about a user's level within a rules-based virtual world hosted by the computer-based server system, wherein the user's level is based on a comparison of one or more attributes of the user and rules associated with the virtual world;
  allowing a user, while the user is not accessing the rules-based virtual world via a web browser that is separate from the client application, to surf the web and receive normal web content different from virtual world content, wherein the normal web content is served from a website on the public Internet, and wherein the virtual world content is served from the server system that is separate and remote from the website; and
  automatically supplementing the normal web content that the user receives via the web browser with additional virtual world content based on information regarding the user's web surfing for normal web content from the client application and the maintained information, thereby causing the user to simultaneously receive and render using the web browser the normal web content from the website and the additional virtual world content from the server system, the additional virtual world content including at least the avatar corresponding to the user, wherein, the avatars comprise virtualized identities corresponding to the users, and are rendered for display to the users along with other virtual world content;
  wherein the step of maintaining information about the user's level includes updating certain of the attributes of the user based on the user's interactions with other users in the virtual world, and
  wherein receiving information regarding the user's web surfing includes receiving a URL from the client application installed on the user's host computing device, and
  wherein the step of maintaining information about the user's level further includes updating certain other of the attributes of the user based on the received information.

\* \* \* \* \*